United States Patent [19]
Claar

[11] Patent Number: 5,112,654
[45] Date of Patent: May 12, 1992

[54] METHOD FOR FORMING A SURFACE COATING

[75] Inventor: Terry D. Claar, Newark, Del.

[73] Assignee: Lanxide Technology Company, LP, Newark, Del.

[21] Appl. No.: 543,277

[22] Filed: Jun. 25, 1990

[51] Int. Cl.⁵ .............................................. B05D 3/02
[52] U.S. Cl. ................................... 427/376.6; 427/201; 427/226; 427/228; 427/191; 427/190
[58] Field of Search ..................... 427/376.6, 201, 226, 427/191, 228, 190

[56] References Cited

U.S. PATENT DOCUMENTS

| | | | |
|---|---|---|---|
| 2,972,556 | 2/1961 | Vrahiotes et al. | 117/106 |
| 3,758,662 | 9/1973 | Tobin | 264/332 |
| 3,864,154 | 2/1975 | Gazza et al. | 29/123 B |
| 4,311,730 | 1/1982 | Pedder | 427/102 |
| 4,353,714 | 10/1982 | Lee et al. | 419/57 X |
| 4,471,059 | 9/1989 | Yoshino et al. | 501/96 |
| 4,492,670 | 1/1985 | Mizrah et al. | 419/12 |
| 4,544,524 | 10/1985 | Mizrah et al. | 419/12 |
| 4,585,618 | 4/1986 | Fresnel et al. | 419/12 |
| 4,595,545 | 6/1986 | Sane | 269/65 |
| 4,605,440 | 8/1986 | Halverson | 75/238 |
| 4,692,418 | 8/1987 | Boecker et al. | 501/90 |
| 4,702,770 | 10/1987 | Pyzik | 75/236 |
| 4,713,360 | 12/1987 | Newkirk et al. | 501/87 |
| 4,718,941 | 1/1988 | Halverson | 75/236 |
| 4,777,014 | 10/1988 | Newkirk et al. | 419/12 |
| 4,793,968 | 12/1988 | Mosser et al. | 419/17 X |
| 4,834,938 | 5/1989 | Pyzik et al. | 419/6 |
| 4,885,130 | 12/1989 | Claar et al. | 419/12 |
| 4,885,131 | 12/1989 | Newkirk | 419/12 |
| 4,891,338 | 1/1990 | Gesing et al. | 501/87 |
| 4,904,446 | 2/1990 | White et al. | 419/13 |
| 4,915,736 | 4/1990 | Claar et al. | 75/238 |
| 4,940,679 | 7/1990 | Claar et al. | 501/96 |
| 4,978,644 | 12/1990 | White et al. | 501/96 |
| 5,004,714 | 4/1991 | Claar et al. | 501/134 |
| 5,010,044 | 4/1991 | Newkirk | 501/93 |
| 5,011,063 | 4/1991 | Claar | 228/122 |
| 5,017,334 | 5/1991 | Claar et al. | 419/12 |
| 5,019,539 | 5/1991 | Claar et al. | 501/87 |

FOREIGN PATENT DOCUMENTS

| | | |
|---|---|---|
| 0165707 | 12/1985 | European Pat. Off. |
| 0193292 | 9/1986 | European Pat. Off. |
| 0239520 | 9/1987 | European Pat. Off. |
| 1492477 | 11/1977 | United Kingdom. |
| WO89/10432 | 11/1989 | World Int. Prop. O. ........ 427/190 |

Primary Examiner—Shrive Beck
Assistant Examiner—Roy V. King
Attorney, Agent, or Firm—Mark G. Mortenson; Stanislav Antolin

[57] ABSTRACT

This invention relates generally to a reaction which occurs on the surface of a substrate body. Particularly, at least one solid oxidant is contacted with at least one parent metal to result in a reaction therebetween and the formation of a reaction product on the surface of a substrate body.

21 Claims, 1 Drawing Sheet

1

METHOD FOR FORMING A SURFACE COATING

FIELD OF THE INVENTION

This invention relates generally to a reaction which occurs on the surface of a substrate body. Particularly, at least one solid oxidant is contacted with at least one parent metal to result in a reaction therebetween and the formation of a reaction product on the surface of a substrate body.

BACKGROUND OF THE PRESENT INVENTION

As follows, there has been significant interest in modifying the properties of known or existing materials in a manner which renders the materials suitable for use in environments which normally would adversely affect such materials. For example, one such modifying approach generally relates to coating onto a surface of a substrate material a second material, which has properties which differ from the underlying substrate material.

Various methods exist for coating substrate materials. A first category of coating processes is generally referred to as overlay coatings. Overlay coatings involve, typically, a physical deposition of a coating material onto a substrate. The coating material typically enhances the performance of the substrate by, for example, increasing the erosion resistance, corrosion resistance, high temperature strength, etc., of the substrate material. These overlay coatings typically result in the substrate material having longer life and/or permit the use of the substrate material in a number of environments which normally might adversely affect and/or destroy the utility of the substrate material absent the placement of the overlay coating thereon.

Commonly utilized overlay coating methods include Chemical Vapor Deposition, Hot Spraying, Physical Vapor Deposition, etc. Briefly, Chemical Vapor Deposition utilizes a chemical process which occurs between gaseous compounds when such compounds are heated. Chemical Vapor Deposition will occur so long as the chemical reaction produces a solid material which is the product of the reaction between the gaseous compounds. The Chemical Vapor Deposition process is typically carried out in a reaction chamber into which both a reactive gas and a carrier gas are introduced. A substrate material is placed into contact with the reactant.

The third category of so-called overlay coatings is Physical Vapor Deposition coatings. Physical Vapor Deposition coatings include, for example, Ion Sputtering, Ion Plating, and Thermal Evaporation.

In Ion Sputtering, a vacuum chamber houses a cathode electrode such that the cathode electrode emits atoms and atomic clusters toward a substrate material to result in a sputtered film or coating being deposited on the substrate.

Ion Plating of a substrate material involves the use of a heated metal source which emits metal atoms toward a substrate material which is to be coated. Specifically, an electron beam is typically utilized to excite the metal atoms from the metal source. The excited metal atoms are then directed toward the substrate material to be coated.

Thermal Evaporation also relies on the excitation of atoms from a metal source. Specifically, in a vacuum chamber, a metal source is heated so that metal atoms evaporate from the metal source and are directed toward a substrate material to be coated. The metal atoms then collect as a coating on the substrate.

A second general category of coating formation techniques is known as conversion coating techniques. In conversion coating techniques, a substrate material, typically, is involved in a chemical reaction which modifies the composition and/or microstructure of the surface of the substrate. These conversion coating techniques also can result in desirable surface modification of substrate materials. Typical examples of conversion coating techniques include Pack Cementation and Slurry Cementation.

Pack Cementation and Slurry Cementation utilize diffusion of one or more materials to form a surface coating. Specifically, in each of these processes, a substrate material is contacted with a metal source material such that a metal from the metal source material may diffuse into the substrate material and/or a component of the substrate material may diffuse toward the metal source material. Specifically, for example, in Pack Cementation, a substrate material is buried within a powder mixture which comprises, typically, both a metal which is to react with the substrate material and an inert material. A carrier gas is then induced to flow into the powder mixture so that the carrier gas can carry metal atoms from the metal powder to the surface of the substrate and deposit the metal atoms thereon. Both Pack Cementation and Slurry Cementation typically occur in a retort or vacuum furnace and the carrier gas is free to transport metal atoms from the metal powder to the surface of the substrate material. Typical carrier gases include the halogen gases. Many different approaches to Pack Cementation have been made, however, most of these approaches utilize the above-discussed steps.

Slurry Cementation is quite similar to Pack Cementation, however, in Slurry Cementation, a composition typically is coated onto a surface of a substrate material prior to conducting the diffusion process in a vacuum or retort furnace. In each of Pack Cementation and Slurry Cementation, the temperature of reaction is typically elevated to permit the metal atoms to react with the substrate by solid state diffusion which results in the formation of a coating material.

The above-discussed coating techniques have been briefly addressed herein to give the reader a general understanding of the art. However, it should be understood that many specific variations to the above-discussed techniques exits. Specifically, each of the coating processes discussed above has been discussed in detail in a number of readily available sources, including textbooks, conference proceedings, and patents. For further information relating to the detail of these procedures, the reader is encouraged to consult the literature referred to above. However, even from the brief discussions above, it is clear that each of the techniques suffers from various limitations. For example, in the overlay coating techniques, the physical deposition of a coating onto a substrate material does not insure an acceptable interface between the substrate and the coating. Specifically, because most of the overlay coating techniques simply rely on the use of a physical bonding between the coating and the substrate, the coating may not adhere to the substrate in a desirable manner. Accordingly, the purpose of the coating may be comprised completely. Additionally, all of the overlay coating processes depend on the use of somewhat complex deposition equipment. For example, Chemical Vapor Deposition requires the use of complicated control means for controlling the rate of flow of reactive and carrier gases in a reaction chamber, the ability to handle corrosive alkali gases (e.g., fluorides and chlorides). Accordingly, the equipment utilized for Chemical Vapor Deposition is typically quite expensive.

Moreover, with regard to the so-called conversion coating techniques which are formed by, for example, Pack Cementation and Slurry Cementation techniques, the coatings which result on substrate materials may not be uniform due to the inclusion of solid materials or porosity which result from exposure of the substrate to either or both the powder metal source and/or inert materials utilized in the Pack Cementation or Slurry Cementation processes. Still further, many of the Pack Cementation and Slurry Cementation techniques may require the use of somewhat complex equipment.

The present invention is a significant improvement over all known prior art techniques in that relatively simple equipment can be utilized to achieve a virtually infinite combination of desirable bodies. Specifically, the present invention permits the formation of a coating on substrate materials or the creation of new materials from, for example, solid oxidant precursor materials. The coatings which form are very dense and are substantially uniform in thickness. Additionally, the coatings can be applied in thicknesses heretofore believed difficult, if not impossible, to achieve. Moreover, due to the simplicity of the process and, for example, the rate of conversion of a solid oxidant material to a reaction product, entire solid oxidant bodies can be converted from one composition to another. These and other aspects of the invention will become apparent to those skilled in the art when reading the following sections.

DISCUSSION OF RELATED PATENT APPLICATIONS

A directed metal oxidation reaction is disclosed in U.S. Pat. No. 4,713,360, which issued on Dec. 15, 1987, and is entitled "Novel Ceramic Materials and Methods for Making Same" and which was issued in the names of Marc S. Newkirk et al. This patent discloses that a molten parent metal can react with a vapor-phase oxidant and result in the directed growth of an oxidation reaction product.

A similar directed metal oxidation reaction process is disclosed in U.S. Pat. No. 4,851,375, which issued on Jul. 25, 1989, and is entitled "Methods of Making Composite Ceramic Articles Having Embedded Filler", and which issued in the names of Marc S. Newkirk et al. This patent disclosed that a molten parent metal can react with an oxidant to grow oxidation reaction product into a substantially inert filler material, thereby forming a ceramic matrix composite body.

The reactive infiltration into a bed or mass comprising boron carbide is discussed in commonly owned U.S. Pat. No. 5,017,334, which issued on May 21, 1991, from U.S. patent application Ser. No. 07/446,433, filed in the names of Terry Dennis Claar et al., on Dec. 5, 1989, and entitled "A Process For Preparing Self-Supporting Bodies and Products Produced Thereby", which is a continuation of U.S. Pat. No. 4,885,130, which issued on Dec. 5, 1989, in the names of Terry Dennis Claar et al., and is entitled "Process For Preparing Self-Supporting Bodies and Products Produced Thereby", which in turn is a Continuation-In-Part Application of U.S. patent application Ser. No. 07/137,044, filed on Dec. 23, 1987, in the names of Terry Dennis Claar et al., and entitled "Process For Preparing Self-Supporting Bodies and Products Made Thereby", and which issued as U.S. Pat. No. 4,940,679, on Jul. 10, 1990, which in turn is a Continuation-In-Part Application of U.S. patent application Ser. No. 07/073,533, (now abandoned) filed in the names of Danny R. White, Michael K. Aghajanian and T. Dennis Claar, on Jul. 15, 1987, and entitled "Process for Preparing Self-Supporting Bodies and Products Made Thereby".

Briefly summarizing the disclosure contained in each of the above-identified patent applications and issued Patent relating to reactive infiltration, self-supporting ceramic bodies are produced by utilizing a parent metal infiltration and reaction process (i.e., reactive infiltration) in the presence of a mass comprising boron carbide. Particularly, a bed or mass comprising boron carbide is infiltrated by molten parent metal, and the bed may be comprised entirely of boron carbide, thus resulting in a self-supporting body comprising one or more parent metal boron-containing compounds, which compounds include a parent metal boride or a parent metal boron carbide, or both, and typically also may include a parent metal carbide. It is also disclosed that the mass of boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of each of the above-identified reactive infiltration patent applications and issued Patent, a mass comprising boron carbide is placed adjacent to or in contact with a body of molten metal or metal alloy, which is melted in a substantially inert environment within a particular temperature envelope. The molten metal infiltrates the boron carbide mass and reacts with the boron carbide to form at least one reaction product. The boron carbide is reducible, at least in part, by the molten parent metal, thereby forming the parent metal boron-containing compound (e.g., a parent metal boride and/or boron compound under the temperature conditions of the process). Typically, a parent metal carbide is also produced, and in certain cases, a parent metal boron carbide is produced. At least a portion of the reaction produce is maintained in contact with the metal, and molten metal is drawn or transported toward the unreacted boron carbide by a wicking or a capillary action. This transported metal forms additional parent metal, boride, carbide, and/or boron carbide and the formation or development of a ceramic body is continued until either the parent metal or boron carbide has been consumed, or until the reaction temperature is altered to be outside of the reaction temperature envelope. The resulting structure comprises one or more of a parent metal boride, a parent metal boron compound, a parent metal carbide, a metal (which, as discussed in each of the above-identified patent applications and issued Patent, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the boron carbide body, the relative amounts of boron carbide and parent metal, alloys of the parent metal, dilution of the boron carbide with a filler, temperature, and time. Preferably, conversion of the boron carbide to the parent metal boride, parent metal boron compound(s) and parent metal carbide is at least about 50%, and most preferably at least about 90%.

The typical environment or atmosphere which was utilized in each of the above-identified patent applications and issued Patent was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boron carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Moreover, U.S. patent application Ser. No. 4,940,679 (discussed above and hereinafter referred to as "Application '679), discloses that in some cases it may be desirable to add a carbon donor material (i.e., a carbon-containing compound) to the bed or mass comprising boron carbide which is to be infiltrated by molten parent metal. Specifically, it was disclosed that the carbon donor material could be capable of reacting with the parent metal to form a parent metal-carbide phase which could modify resultant mechanical properties of the composite body, relative to a composite body which was produced without the use of a carbon donor material. Accordingly, it was disclosed that reactant concentrations and process conditions could be altered or controlled to yield a body containing varying volume percents of ceramic compounds, metal and/or porosity. For example, by adding a carbon donor material (e.g., graphite powder or carbon black) to the mass of boron carbide, the ratio of parent metal-boride/parent metal-carbide could be adjusted. In particular, if zirconium was used as the parent metal, the ratio of $ZrB_2/ZrC$ could be reduced (i.e., more ZrC could be produced due to the addition of a carbon donor material in the mass of boron carbide).

Still further, Issued U.S. Pat. No. 4,885,130 (discussed above and hereinafter referred to as "Patent '130"), disclosed that in some cases it may be desirable to add a boron donor material (e.g., a boron-containing compound) to a bed or mass of boron carbide which is to be infiltrated by molten parent metal. The added boron-containing compound can then behave in a manner similar to the carbon-containing compound discussed above in relation to Application '044, except that the ratio of $ZrB_2/ZrC$ could be increased, as opposed to reduced.

Still further, U.S. Pat. No. 4,904,446, which issued on Feb. 27, 1990, in the names of Danny Ray White and Terry Dennis Claar and entitled "Process For Preparing Self-Supporting Bodies and Products Made Thereby", discloses that a parent metal can react with a mass comprising boron nitride to result in a body comprising a boron-containing compound, a nitrogen-containing compound and, if desired, a metal. The mass comprising boron nitride may also contain one or more inert fillers. Relative amounts of reactants and process conditions may be altered or controlled to yield a body containing a varying volume percents of ceramic, metal and/or porosity.

Moreover, commonly owned U.S. Pat. No. 5,019,539, which issued on May 28, 1991, from U.S. patent application Ser. No. 07/296,961, which was filed on Jan. 13, 1989, in the names of Terry Dennis Claar et al., and entitled "A Process for Preparing Self-Supporting Bodies Having Controlled Porosity and Graded Properties and Products Produced Thereby", discloses that a powdered parent metal can be mixed with a bed or mass comprising boron carbide and, optionally, one or more inert fillers, to form a self-supporting body. The application also discloses that the properties of a composite body can be modified by, for example, tailoring the porosity by appropriate selection of the size and/or composition of the parent metal powder or particulate, etc., which is mixed with the boron carbide.

The disclosures of each of the above-discussed Commonly Owned U.S. Patents and U.S. Patent Applications are herein expressly incorporated by reference.

SUMMARY OF THE INVENTION

In accordance with the present invention, there is provided a number of methods for producing coatings on bodies. Specifically, a solid oxidant source and a parent metal source are caused to react on the surface of a substrate material to form a ceramic or ceramic composite coating.

In a first preferred embodiment of the invention, a substrate material, which may or may not be reactive with a powdered parent metal, is coated with a mixture of a powdered parent metal and a solid oxidant powder. The powdered parent metal and solid oxidant powder are caused to react with each other by elevating the temperature in the reaction chamber to the reaction temperature. The environment within the reaction chamber is substantially inert. If an amount of parent metal provided is in excess of the stoichiometric amount needed to react substantially completely with the solid oxidant powder, and the substrate material which is provided is also reactive with the parent metal powder, then the parent metal powder may also react with the solid oxidant substrate.

In a second preferred embodiment of the invention, a method substantially similar to the above-discussed first preferred embodiment is modified by combining a substantially inert filler material with a mixture of powdered parent metal and solid oxidant powder prior to causing the powdered parent metal and solid oxidant powder to react together to form a reaction product. However, similar to the first preferred embodiment discussed above herein, the amount of parent metal provided may be in excess of that which is needed to react substantially completely with the solid oxidant. Accordingly, if a reactive substrate is provided, the powdered parent metal may also react with the reactive substrate.

In each of the above-discussed preferred embodiments, it is possible for an excess amount of parent metal to be provided and the substrate to be nonreactive. In this instance, residual parent metal may b present in the reaction product coating which is formed on the substrate.

DEFINITIONS

As used herein in the specification and the appended claims, the terms below are defined as follows:

"Different" as used herein in conjunction with chemical compositions, means that a primary chemical constituent of one material differs from a primary chemical constituent of another referenced material.

"Filler" as used herein, means either single constituents or mixtures of constituents which are substantially non-reactive with, and/or of limited solubility in, parent metal powders and/or parent metal vapors and may be single or multi-phase. Fillers may be provided in a wide variety of forms such as powders, flakes, platelets, microspheres, whiskers, bubbles, etc., and may be dense or porous. "Fillers" may also include ceramic fillers, such as alumina or silicon carbide as fibers, particulates, whiskers, bubbles, spheres, fibermats, or the like, and ceramic-coated fillers such as carbon fibers coated with alumina or silicon carbide to protect the carbon from attack. "Fillers" may also include metals. "Fillers" should also be capable of surviving the processing conditions.

"Parent Metal Powder" as used herein, means that metal (e.g., zirconium, titanium, hafnium, etc.) which is the precursor for a reaction product of the powdered parent metal and a solid oxidant (e.g., parent metal carbides, etc.) and includes that metal as a pure or relatively pure metal, a commercially available metal having impurities and/or alloying constituents therein and an alloy in which that metal precursor is the major constituent. When a specific metal is mentioned as the powdered parent metal, the metal identified should be read with this definition in mind unless indicated otherwise by the context.

"Reaction Product" as used herein, means the product which forms as a result of the reaction between a parent metal and a solid oxidant.

"Solid Oxidant" as used herein, means an oxidant in which the identified solid is the sole, predominant, or at least a significant oxidizer of the parent metal under the conditions of the process.

DETAILED DESCRIPTION OF THE INVENTION AND PREFERRED EMBODIMENTS

Figure 1:
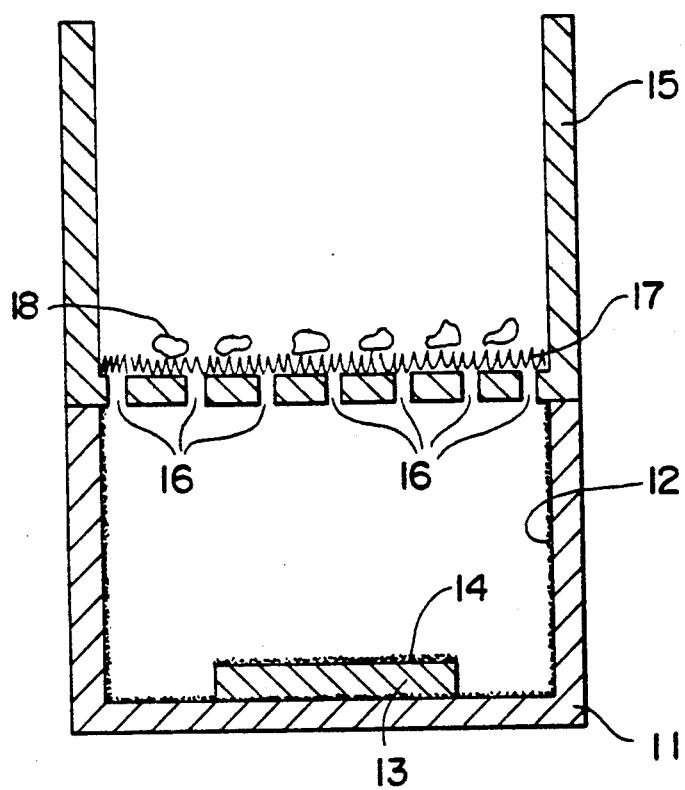
FIG. 1 is a schematic cross-sectional view of an assembly utilized to produce a coating in accordance with the present invention.

In accordance with the present invention, there is provided a number of methods for producing coatings on bodies. Specifically, a solid oxidant source and a parent metal source are caused to react on the surface of a substrate material to form a ceramic or ceramic composite coating.

In a first preferred embodiment of the invention, a substrate material, which may or may not be reactive with a powdered parent metal, is coated with a mixture of a powdered parent metal and a solid oxidant powder. The powdered parent metal and solid oxidant powder are caused to react with each other by elevating the temperature in the reaction chamber to the reaction temperature. The environment within the reaction chamber is substantially inert. If an amount of parent metal provided is in excess of the stoichiometric amount needed to react substantially completely with the solid oxidant powder, and the substrate material which is provided is also reactive with the parent metal powder, then the parent metal powder may also react with the solid oxidant substrate.

In a second preferred embodiment of the invention, a method substantially similar to the above-discussed first preferred embodiment is modified by combining a substantially inert filler material with a mixture of powdered parent metal and solid oxidant powder prior to causing the powdered parent metal and solid oxidant powder to react together to form a reaction product. However, similar to the first preferred embodiment discussed above herein, the amount of parent metal provided may be in excess of that which is needed to react substantially completely with the solid oxidant. Accordingly, if a reactive substrate is provided, the powdered parent metal may also react with the reactive substrate.

In each of the above-discussed preferred embodiments, it is possible for an excess amount of parent metal to be provided and the substrate to be nonreactive. In this instance, residual parent metal may be present in the reaction product coating which is formed on the substrate.

A category of materials which have been given a substantial amount of attention for many high temperature applications is the graphite or carbonaceous materials. Specifically, carbon-based materials (e.g., carbon/carbon composites, solid forms of graphite, etc.) have received a substantial amount of attention because they are relatively light in weight, have excellent high temperature properties, are thermal shock resistant, and have desirable electrical properties. However, the use of carbon-based materials for many applications has been limited due to the poor oxidation and/or erosion (e.g., abrasion) resistance inherent to these materials. Thus, many approaches for forming some type of protective coating on carbon-based materials have been attempted. The techniques of the present invention are well suited for coating carbon-based materials.

The present invention has been shown in some of its preferred embodiments in the following Example.

EXAMPLE 1

The following Example demonstrates a method for forming a ceramic composite coating on a graphite substrate by applying to the surface of the graphite substrate a mixture comprised of a parent metal powder and a solid oxidant boron carbide powder and heating the powder-covered graphite substrate in an inert atmosphere to permit reaction between the parent metal powder, the boron carbide powder and/or the graphite substrate.

FIG. 1 is a cross-sectional schematic view of a set-up used to form a ceramic composite coating on a graphite substrate coupon, as discussed below.

A substrate coupon 13 of Grade TRA-1 graphite (Poco Graphite, Inc., Decatur, TX), measuring about 1 inch (25 mm) long, about 1 inch (25 mm) wide and about 0.2 inch (5.1 mm) thick, was prepared for coating by hand sanding one surface of the substrate with 220 grit (average particle size of about 66 μm) silicon carbide abrasive paper until the surface was substantially roughened. A slurry mixture comprised of by weight about 66.3% -325 mesh (particle size less than about 45

μM) zirconium powder (Consolidated Astronautics, Saddle Brook, NJ), about 9.5% TETRABOR® 1000 grit (average particle size of about 5 μm) boron carbide (ESK-Engineered Ceramics, New Canaan, CT), about 24.0% deionized water and about 0.2% XUS40303.00 tertiary amide polymer ceramic binder (Dow Chemical Company, Midland, MI) was prepared by combining the slurry mixture components in a plastic jar and roll mixing on a jar mill for at least 2 hours. A portion of the slurry mixture was applied by painting onto the roughened surface of the graphite substrate coupon. Three separate coats of the slurry mixture were painted onto the roughened surface. Each application of the slurry mixture was allowed to air dry before the next application was made. After the three slurry mixture applications had substantially completely air dried to form a powder coating 14, the powder coated graphite substrate coupon was placed in a forced air oven set at about 45° C. After about 0.5 hour at about 45° C., the powder coated graphite substrate coupon was moved to a second forced oven set at about 120° C. for about an additional 0.5 hour. After drying, the powder coating thickness on the graphite substrate coupon measured about 0.04 inch (1 mm) and weighed about 1.42 grams.

A first graphite boat 11, measuring about 4 inches (102 mm) long, about 4 inches (102 mm) wide, about 1 inch (25 mm) high and having a wall thickness of about 0.25 inch (6.4 mm), was machined from a piece of Grade ATJ graphite (Union Carbide Corporation, Graphite Products Division, Cleveland, OH). The inner surface of the first graphite boat 11 was coated with a paintable slurry 12 comprises of -325 mesh (particle size less than about 45 μm) zirconium powder and ZAP aluminum oxyphosphate water based specialty rigidizer (ZYP Coatings, Inc., Oakridge, TN) to getter any residual oxygen from the argon atmosphere in a vacuum furnace, as discussed below. After the inner surface of the first graphite boat 11 had substantially completely dried, the powder coated graphite substrate coupon 13 was placed into the bottom of the first graphite boat 11. The uncoated surface of the graphite substrate coupon 13 contacted the inner bottom surface of the first graphite boat 11.

A second graphite boat 15 having substantially the same dimensions as the first graphite boat was prepared, however, the second boat 15 included an array of 0.25 inch (6.4 mm) diameter holes 16 drilled through the bottom of the second graphite boat 15. The second boat 15 was placed on top of and was substantially aligned with the first graphite boat 11. Grade GH graphite felt 17 (Fiber Materials, Inc., Biddeford, ME) measuring about 0.125 inch (3.2 mm) thick was placed into and substantially covered the bottom of the second graphite boat 15. Pieces of a hafnium sponge material 18 (Teledyne Wah Chang, Albany, OR), having diameters ranging from about 0.033 inch (0.84 mm) to about 0.25 inch (6.4 mm), were substantially uniformly spread onto the graphite felt 17 within the second graphite boat 15 to complete the formation of the setup.

The setup comprising the two graphite boats and their contents was then placed into a vacuum furnace. The vacuum furnace was first evacuated to about $9.2 \times 10^{-6}$ torr and then to about $2.2 \times 10^{-4}$ torr. After about 18 hours at about $2.2 \times 10^{-4}$ torr, the vacuum furnace was filled with argon at a rate of about 10 liters per minute. The vacuum furnace and its contents were then heated to about 200° C. at about 100° C. per hour, then from about 200° C. to about 450° C. at about 50° C. per hour, and finally, from about 450° C. to about 1900° C. at about 240° C. per hour while maintaining the argon flow rate of about 2 liters per minute and a vacuum furnace pressure of about 2 pounds per square inch (psi) (0.141 kg/cm$^2$) higher than atmospheric pressure. After about an hour at about 1900° C. with an argon flow rate of about 2 liters per minute and a vacuum furnace pressure of about 2 psi (0.141 kg/cm$^2$), the vacuum furnace and its contents were cooled to about room temperature in about 8 hours.

At about room temperature, the vacuum furnace door was opened and the setup was removed from the vacuum furnace. The setup was disassembled to reveal that the powder mixture on the graphite substrate coupon and reacted to form a ceramic composite coating on the graphite substrate coupon. Analysis of the coating on the graphite substrate coupon was performed in a scanning electron microscope using energy-dispersive spectroscopy. The results of the analysis revealed that a ceramic composite coating, comprising an about 40 μm thick layer of a zirconium carbide was adjacent to the graphite substrate and an about 300 μm thick layer of zirconium boride and zirconium carbide ceramic composite was adjacent to the 40 μm thick layer of a zirconium carbide, had been formed.

What is claimed is:

1. A method for forming a coating on a substrate material comprising:
   providing a substrate body comprising a carbon-based material;
   placing a powdered parent metal and a powdered solid oxidant comprising boron carbide, or boron carbide and a carbon donor material, or boron carbide and a boron donor material on at least a portion of at least one surface of said substrate body;
   heating said powdered parent metal, said powdered solid oxidant and said at least one surface of said substrate body to cause said parent metal and said powdered solid oxidant to react; and
   continuing said reaction for a sufficient amount of time to produce a coating on at least one surface of said substrate material.

2. A method for forming a coating on a substrate material consisting essentially of:
   providing a substrate body;
   placing a powdered parent metal, a substantially inert filler material and a powdered solid oxidant comprising boron carbide or boron carbide and a carbon donor material or boron carbide and a boron donor material on at least a portion of at least one surface of said substrate body;
   heating said powdered parent metal, said inert filler, said powdered solid oxidant and said at least one surface of said substrate body to cause said parent metal and said powdered solid oxidant to react; and
   continuing said reaction for a sufficient amount of time to produce a coating on said at least one surface of said substrate material.

3. A method for forming a coating on a substrate material consisting essentially of:
   providing a substrate body;
   placing a powdered parent metal and a powdered solid oxidant comprising boron nitride on at least a portion of at least one surface of said substrate body;
   heating said powdered parent metal, said powdered solid oxidant and said at least one surface of said substrate body to cause said parent metal and powdered solid oxidant to react; and continuing said reaction for a sufficient amount of time to produce a coating on at least one surface of said substrate material.

4. The method according to claim 1, wherein the parent metal substantially completely reacts with the powdered solid oxidant.

5. The method according to claim 1, further providing an amount of powdered parent metal in excess of a stoichiometric amount needed to react substantially completely with the powdered solid oxidant.

6. The method according to claim 1, wherein the heating comprises heating to a reaction temperature.

7. The method according to claim 1, further comprising placing powdered parent metal and powdered solid oxidant on substantially all of the surfaces of the substrate body.

8. The method according to claim 1, wherein said powdered parent metal comprises at least one metal selected from the group consisting of silicon, titanium, hafnium, lanthanum, iron, calcium, vanadium, niobium, magnesium, zirconium and beryllium.

9. The method according to claim 1, wherein said at least one surface of said substrate body comprises a solid oxidant.

10. The method according to claim 1, wherein said carbon-based material comprises at least one material selected from the group consisting of a carbon/carbon composite and graphite.

11. The method according to claim 1, wherein the powdered parent metal comprises zirconium, the powdered solid oxidant comprises boron carbide, the substrate body comprises graphite, and the coating comprises zirconium carbide and zirconium boride.

12. The method according to claim 1, wherein the heating occurs in a substantially inert atmosphere.

13. The method according to claim 2, wherein said powdered parent metal comprises at least one metal selected from the group consisting of silicon, titanium, hafnium, lanthanum, iron, calcium, vanadium, niobium, magnesium, zirconium and beryllium.

14. The method according to claim 2, wherein said at least one surface of said substrate body comprises a solid oxidant.

15. The method according to claim 2, wherein said at least one surface of said substrate body comprises a solid oxidant comprising a carbon-based material.

16. The method according to claim 2, wherein the parent metal powder comprises zirconium, the powdered solid oxidant comprises boron carbide, the substrate body comprises graphite, and the coating comprises zirconium carbide and zirconium boride.

17. The method according to claim 2, wherein the heating occurs in a substantially inert atmosphere.

18. The method according to claim 5, wherein the substrate body comprises a solid oxidant and the excess parent metal reacts with the substrate body.

19. The method according to claim 8, wherein said powdered parent metal comprises at least one metal selected from the group consisting of titanium, hafnium and zirconium.

20. The method according to claim 13, wherein said powdered agent metal comprises at least one metal selected from the group consisting of titanium, hafnium and zirconium.

21. The method according to claim 15, wherein said carbon-based material comprises at least one material selected from the group consisting of a carbon/carbon composite and graphite.

* * * * *